(12) United States Patent
Conroy et al.

(10) Patent No.: US 7,970,285 B2
(45) Date of Patent: Jun. 28, 2011

(54) MULTICHANNEL OPTICAL TRANSPORT NETWORK OPTICAL DETECTION SKEW CALIBRATION

(75) Inventors: Keith Conroy, Perkasie, PA (US); Omer Acikel, San Diego, CA (US); Francesco Caggioni, Winchester, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 528 days.

(21) Appl. No.: 12/242,433

(22) Filed: Sep. 30, 2008

(65) Prior Publication Data
US 2010/0080570 A1 Apr. 1, 2010

(51) Int. Cl.
*H04J 14/00* (2006.01)
*H04J 14/06* (2006.01)
*H04J 14/08* (2006.01)
*H04B 10/00* (2006.01)
*H04B 10/12* (2006.01)

(52) U.S. Cl. ............ 398/154; 398/53; 398/65; 398/102; 398/188

(58) Field of Classification Search .................... 398/43, 398/53, 65, 102, 152, 154, 161, 184, 188
See application file for complete search history.

*Primary Examiner* — Armando Rodriguez
(74) *Attorney, Agent, or Firm* — Law Office of Gerald Maliszewski; Gerald Maliszewski

(57) ABSTRACT

A system and method are provided for calibrating temporal skew in a multichannel optical transport network (OTN) transmission device. The method accepts a pair of $2^n$-phase shift keying ($2^n$-PSK) modulated signals, as well as a pair of $2^p$-PSK modulated signals. The $2^n$-PSK and $2^p$-PSK signals are converted to $2^n$-PSK and $2^p$-PSK optical signals, respectively. The $2^n$-PSK and $2^p$-PSK optical signals are orthogonally polarized and transmitted. A timing voltage is generated that is responsive to the intensity of the orthogonally polarized signals. The timing voltage is correlated to a reference frame calibration pattern associated with a preamble/header portion of an OTN frame. Then, the timing voltages associated with the Ix, Qx, Iy, and Qy signal paths are compared, and the misalignment between the timing voltages and the reference frame calibration pattern is minimized in response to adjusting time delay modules in the Ix, Qx, Iy, and Qy signal paths.

20 Claims, 10 Drawing Sheets

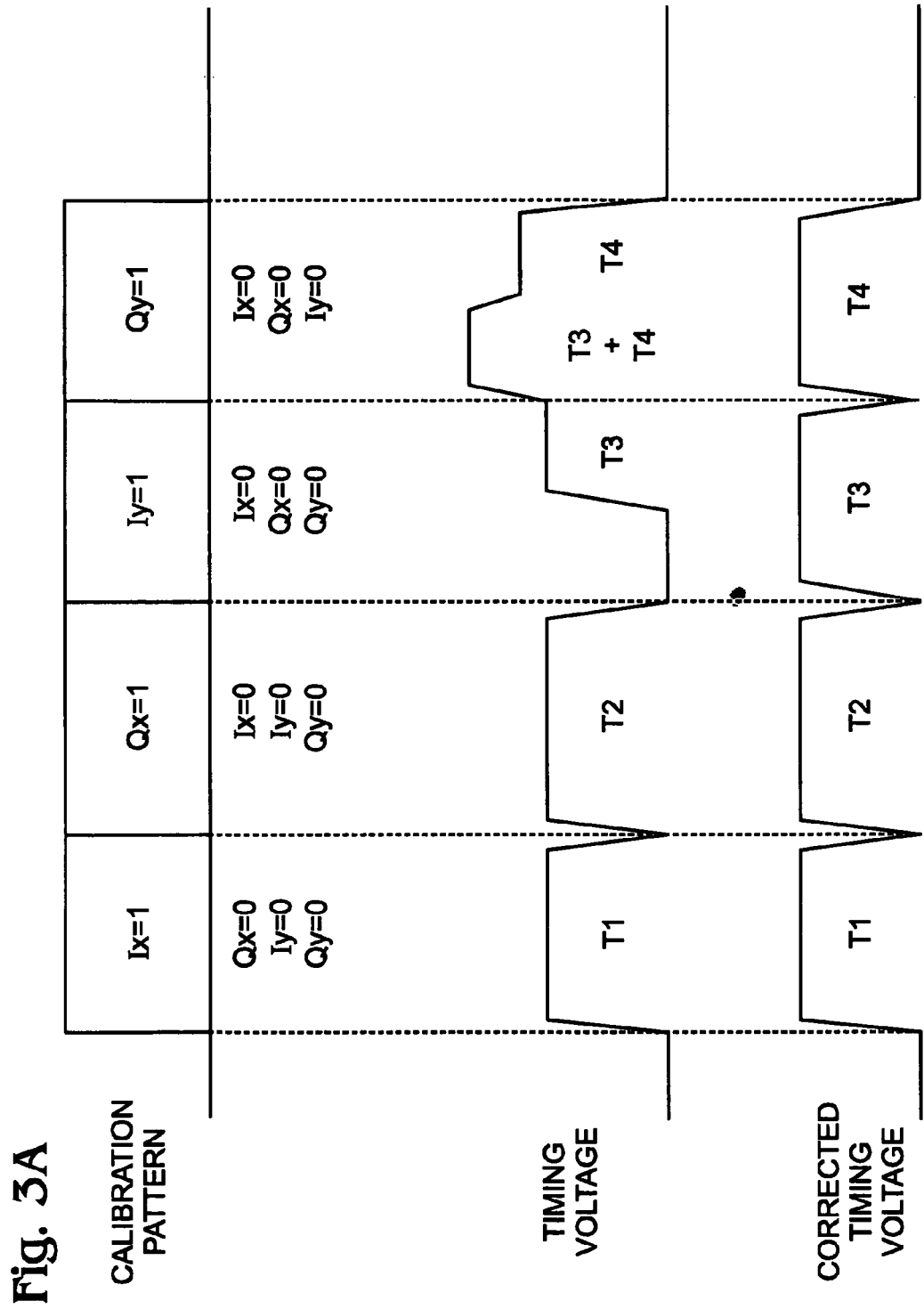

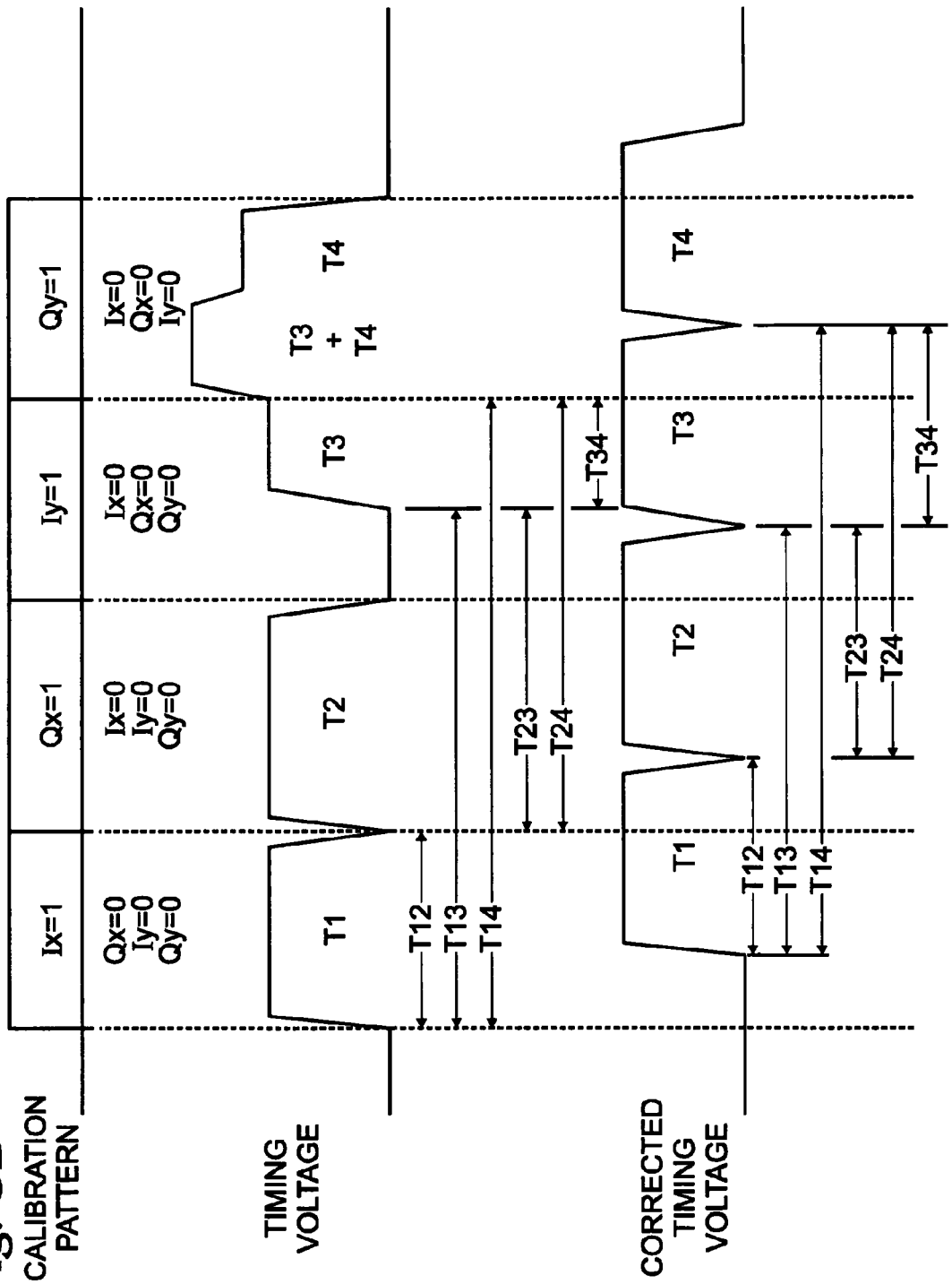

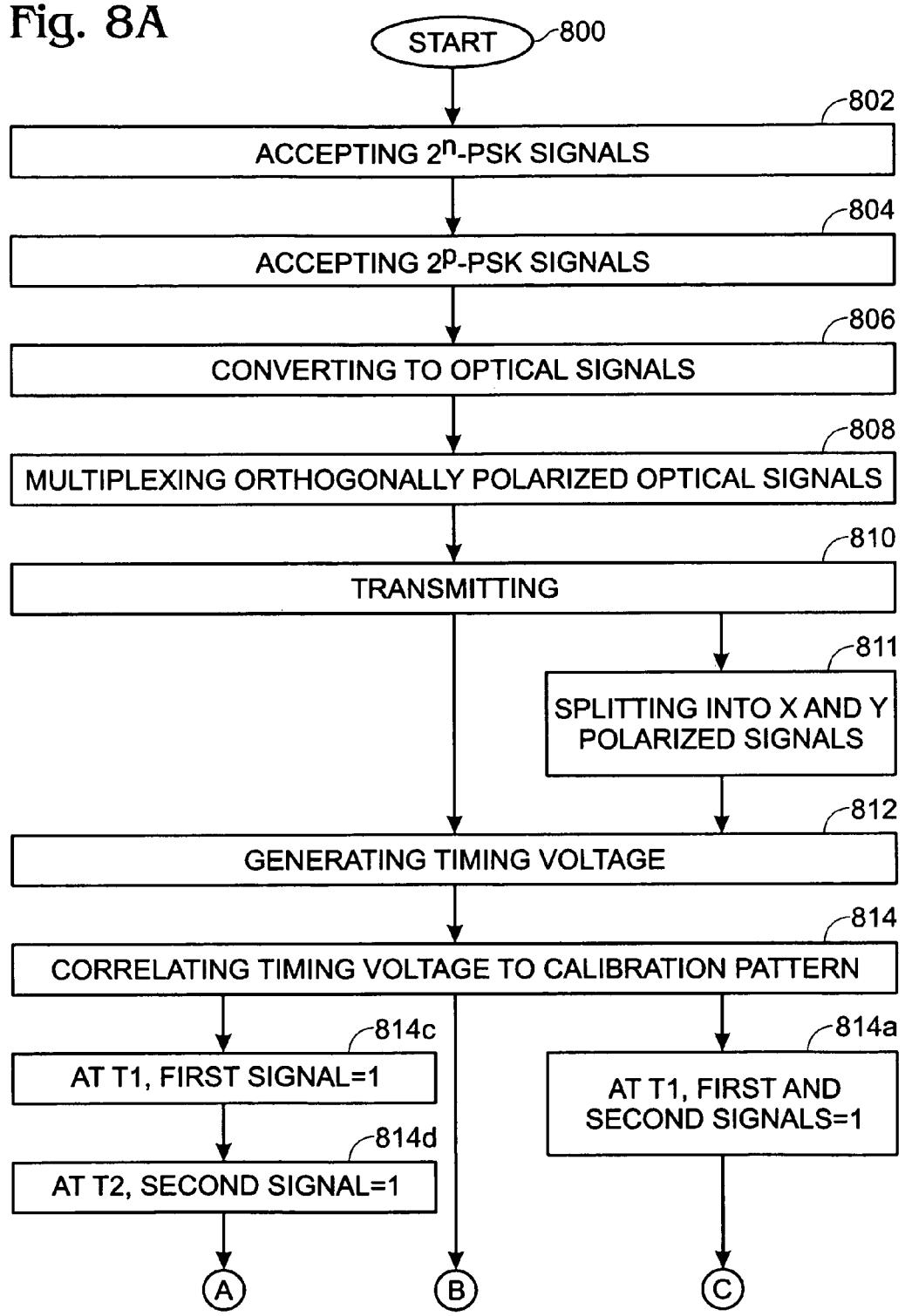

MULTICHANNEL OPTICAL TRANSPORT NETWORK OPTICAL DETECTION SKEW CALIBRATION

BACKGROUND OF THE INVENTION

1. Field of the Invention

This invention generally relates to signal communications and, more particularly, to a system and method for minimizing skewing errors in a network using a multi-channel Optical Transport Network (OTN) protocol.

2. Description of the Related Art 100 gigabit per second (Gbps) OTN protocols are being developed where the OTN streams are carried in a "parallel fashion" at a bit-rate greater than 100 Gbps. Until recently, optical signals have been carried using modulations techniques carrying 1 bit per symbol. However, the need for faster signal speeds means that return to zero (RZ), non-return to zero (NRZ), and phase-shift keying (PSK) modulation techniques (1 bit per symbol) are no longer suitable.

FIG. 1 is a schematic diagram depicting a system for the transmission of high speed signals (40/100 Gbps and above) using multiplexed orthogonal optical polarization, with 2 bits per symbol per polarization, for a total of 4 bits/symbol (prior art). Mach-Zehnder modulators (MZMs) convert electrical signals to optical signals, and phase shift is introduced between the I and Q signal paths. Any skew (differential time delay) experienced in the modulation of the transmitted signal is translated to the receiver, making the recovery of a serial stream from parallel streams difficult. Alternately but not shown, phase shift may be introduced before the electrical signals are converted to optical signals.

It would be advantageous if a technique could be developed to minimize differential time delay or skew in the parallel pathways of a multiplexed orthogonally polarized OTN signal.

It would be advantageous if skew could be calibrated by detecting polarized OTN signals in the optical domain.

SUMMARY OF THE INVENTION

The present invention presents a system and method that address electrical skew control between complex envelope channel components, within and between polarization branches. The invention detects polarized OTN signals in the optical domain, and converts the optical signals to simple voltage amplitudes, which are used to calibrate delay through each parallel path.

Accordingly, a method is provided for calibrating temporal skew in a multichannel optical transport network (OTN) transmission device. The method accepts a pair of $2^n$-phase shift keying ($2^n$-PSK) modulated signals via Ix and Qx electrical signal paths, where n>1, as well as a pair of $2^p$-PSK modulated signals via Iy and Qy electrical signal paths where p>1. The $2^n$-PSK and $2^p$-PSK signals are converted to $2^n$-PSK and $2^p$-PSK optical signals, respectively. The $2^n$-PSK and $2^p$-PSK optical signals are orthogonally polarized and transmitted. A timing voltage is generated that is responsive to detecting the intensity of the orthogonally polarized signals. The timing voltage is correlated to a reference frame calibration pattern associated with a preamble/header portion of an OTN frame. Then, the timing voltages associated with the Ix, Qx, Iy, and Qy signal paths are compared, and the misalignment between the timing voltages and the reference frame calibration pattern is minimized in response to adjusting time delay modules in the Ix, Qx, Iy, and Qy signal paths.

For example, the timing voltage can be correlated to a reference frame calibration pattern selectively representing a "1" logic value for each of the Ix, Qx, Iy, and Qy signals, so that a sequence of timing voltage pulses is generated. Any misalignment between the timing voltages and the reference frame calibration pattern is minimized by temporally matching the timing voltage pulses to the sequence of Ix, Qx, Iy, and Qy signals in the reference frame calibration pattern. In one aspect, the reference frame calibration pattern exclusively represents a "1" logic value each of the Ix, Qx, Iy, and Qy signals in sequence, so that a timing voltage pulse is generated sequentially, for each of the Ix, Qx, Iy, and Qy signals in the reference frame calibration pattern.

Additional details of the above-described method and a system for controlling time delay in a multichannel OTN transmission device are described below.

BRIEF DESCRIPTION OF THE DRAWINGS

FIGS. 3A and 3B are timing diagrams representing an exemplary reference frame calibration pattern and associated timing voltage.

FIGS. 8A and 8B are a flowchart illustrating a method for calibrating temporal skew in a multichannel OTN transmission device.

DETAILED DESCRIPTION

Figure 1:
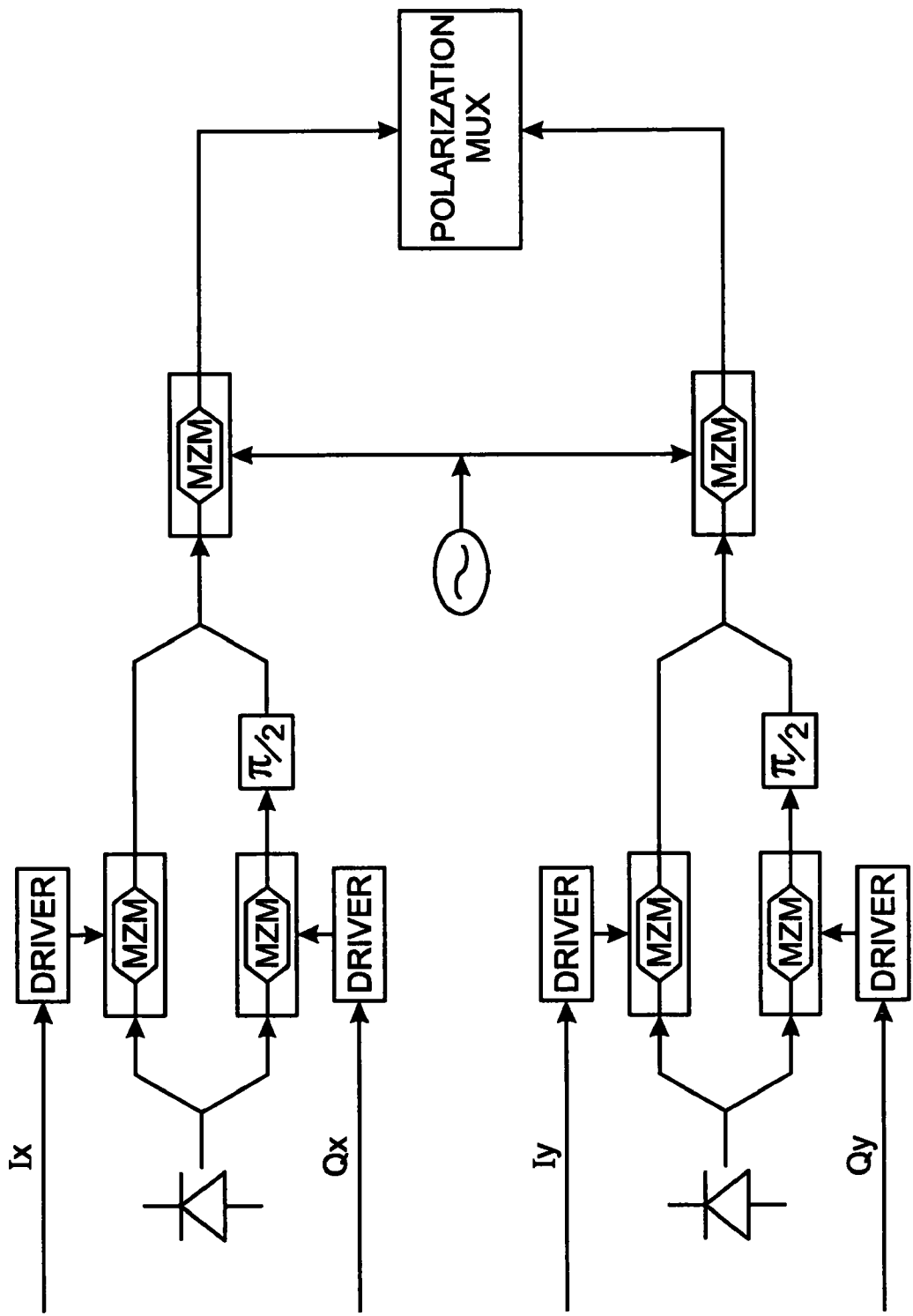
FIG. 1 is a schematic diagram depicting a system for the transmission of high speed signals (40/100 Gbps and above) using multiplexed orthogonal optical polarization, with 2 bits per symbol per polarization, for a total of 4 bits/symbol (prior art).
Figure 2:
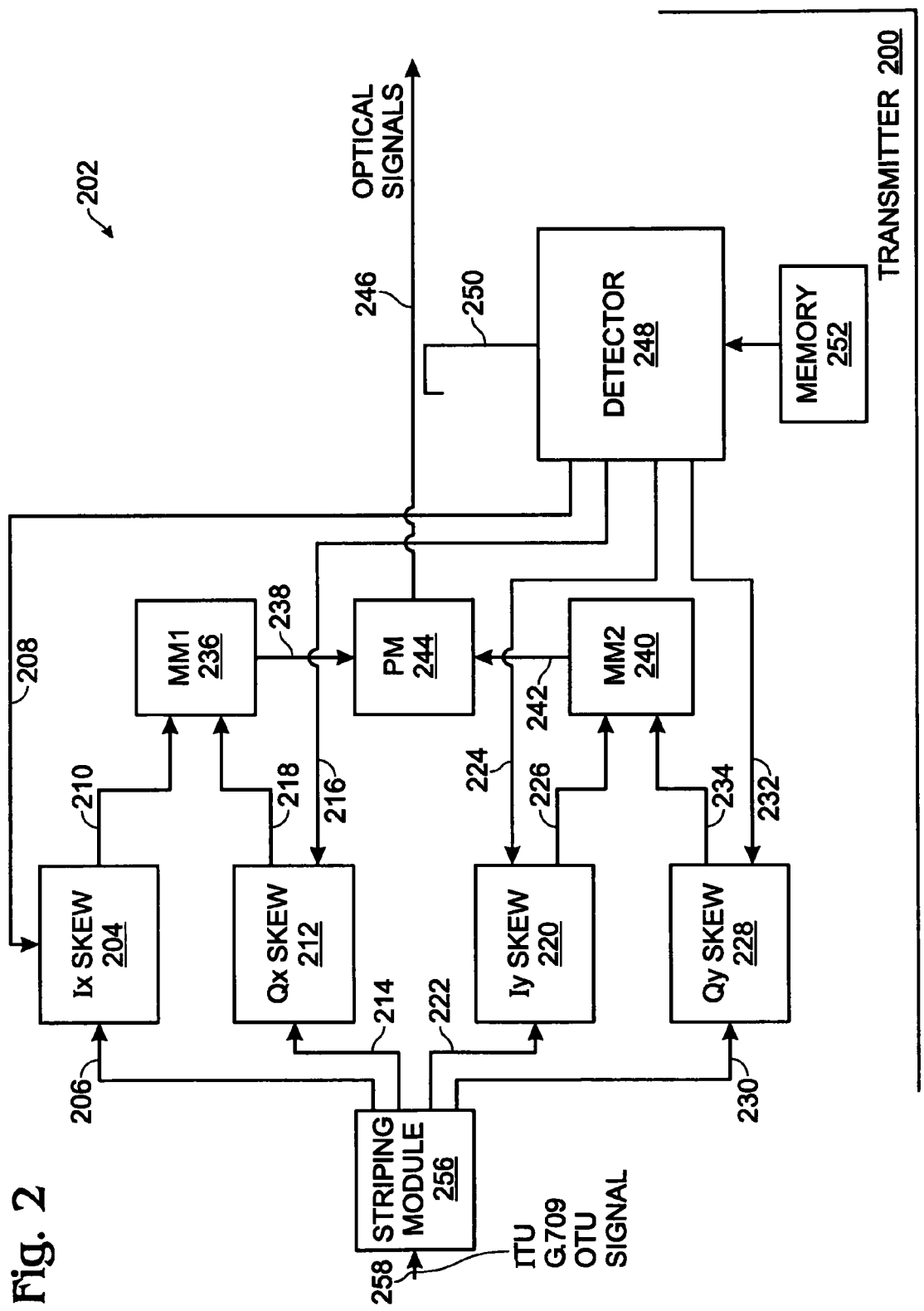
FIG. 2 is a schematic block diagram of a system for calibrating temporal skew in a multichannel optical transport network (OTN) transmission device.

FIG. 2 is a schematic block diagram of a system for calibrating temporal skew in a multichannel optical transport network (OTN) transmission device 200. The system 202 comprises an Ix skew module 204 having an input on line 206 to accept an Ix signal from a pair of $2^n$-phase shift keying ($2^n$-PSK) modulated signals, where n>1. The Ix skew module 204 has a control port on line 208 and an output on line 210 to supply the Ix signal delayed in time in response to signals received at the control port. A Qx skew module 212 has an input on line 214 to accept an Qx signal from the pair of $2^n$-PSK modulated signals. The Qx skew module 212 has a control port on line 216 and an output on line 218 to supply the Qx signal delayed in time in response to signals received at the control port. There are many ways that are known in the art for introducing time and phase delays into an electrical signal that may be adapted for use in the skew modules.

An Iy skew module 220 has an input on line 222 to accept an Iy signal from a pair of $2^p$-PSK modulated signals, where p>1. In one aspect, p=2. The Iy skew module 220 has a control port on line 224 and an output on line 226 to supply the Iy signal delayed in time in response to signals received at the control port. A Qy skew module 228 has an input on line 230 to accept a Qy signal from the pair of $2^p$-PSK modulated signals. The Qy skew module 228 has a control port on line 232 and an output on line 234 to supply the Qy signal delayed in time in response to signals received at the control port.

A first modulation module (MM) 236 (e.g., a Mach-Zehnder modulator) has inputs on lines 210 and 218 to accept the delayed Ix and Qx signals, respectively, and an output on line 238 to supply a $2^n$-PSK optical signal. A second modulation module 240 has inputs on lines 226 and 234, respectively, to accept the delayed Iy and Qy signals, and an output on line 242 supply a $2^p$-PSK optical signal. A polarization multiplexer (PM) 244 has inputs on lines 238 and 242 to accept the $2^n$-PSK and $2^p$-PSK optical signals, respectively, and an output on line 246 to supply multiplexed orthogonally polarized $2^n$PSK and $2^p$PSK optical signals for transmission.

A detector 248 has an input on line 250 to accept sampled $2^n$-PSK and $2^p$-PSK optical signals. The detector 248 generates a timing voltage (or current) responsive to detecting the intensity of the orthogonally polarized signals. The detector 248 correlates the timing voltage to a reference frame calibration pattern associated with a preamble/header portion of an OTN frame, and compares timing voltages associated with the Ix, Qx, Iy, and Qy signal paths. The detector 248 has an output to supply control signals to the Ix, Qx, Iy, and Qy skew modules on lines 208, 216, 224, and 232, respectively. Misalignment between the timing voltages and the reference frame calibration pattern is minimized in response to adjusting time delays in the Ix, Qx, Iy, and Qy signal paths.

The detector 248 correlates the timing voltage to a reference frame calibration pattern selectively representing a "1" logic value for each of the Ix, Qx, Iy, and Qy signals, and generates a sequence of timing voltage pulses associated with a sequence of Ix, Qx, Iy, and Qy signals in the reference frame calibration pattern. Any misalignment between the timing voltages and the reference frame calibration pattern is minimized by temporally matching the timing voltage pulses to the sequence of Ix, Qx, Iy, and Qy signals in the reference frame calibration pattern. The detector 248 correlates the timing voltage either to a calibration pattern received in a preamble/header portion of an OTN frame, or a calibration pattern extracted from memory 252.

Typically, the system 202 further comprises a striping module 256 that accepts an ITU G.709 OTN signal on line 258. Striping module 256 performs multiplex processing to provide four parallel paths carrying the $2^n$-PSK and $2^p$-PSK electrical signals on lines 206, 214, 222, and 230. In the system shown, deskewing operations are performed between the modulation and polarization functions. In other aspects not shown, deskewing calibrations may be performed prior to modulation, or both before and after modulation of the electronic signals.

FIGS. 3A and 3B are timing diagrams representing an exemplary reference frame calibration pattern and associated timing voltage. In this aspect, the detector correlates the timing voltage to a reference frame calibration pattern, where a "1" logic value exclusively represents each of the Ix, Qx, Iy, and Qy signals in sequence. As shown in FIG. 3A, a sequence of "1" logic values represent Ix, followed by Qx, followed by Iy, followed by Qy. Other sequences, not shown, may use a "1" logic value exclusively representing each of the Ix, Qx, Iy, and Qy signals in different sequence order. For example, the sequence can be Ix, Iy, Qx, and Qy.

As a result, a timing voltage pulse is generated sequentially, for each of the Ix, Qx, Iy, and Qy signals in the reference frame calibration pattern. Generally, misalignment between the timing voltages and the reference frame calibration pattern is minimized by temporally matching the timing voltage pulses to the sequence of Ix, Qx, Iy, and Qy signals in the reference frame calibration pattern. As shown, the timing voltage associated with the Iy signal is delayed. Misalignment between the timing voltage and reference frame calibration pattern can be minimized by reducing the delay in the Iy signal path, see the corrected timing voltage.

In FIG. 3B, the timing voltage associated with signal path Iy is also delayed. In this aspect, misalignment between the timing voltage and reference frame calibration pattern is minimized by increasing the delays in the Ix, Qx, and Qy signal paths. The timing voltage and reference calibration pattern need not necessarily have exactly the same timing. Misalignment between the timing voltage and reference frame calibration pattern is defined as a misalignment in the pattern created by the timing voltage, as compared to the calibration pattern. Alternately stated, the timing voltage and calibration pattern can be in alignment if the patterns have identical timing between elements in the pattern, but are offset in time. That is, the timing voltage and calibration pattern can be in alignment if the Ix, Qx, Iy, Qy calibration pattern matches the Ix, Qx, Iy, Qy timing voltages, but the start of the timing voltage is offset from the start of the calibration pattern (as shown).

Referencing FIG. 3A, the detector correlates the timing voltage to a reference frame calibration pattern representing a "1" logic value for a first signal (Ix, Qx, Iy, or Qy signals) in a first timeslot period (T1). In this example, the first signal is Ix. In a second timeslot period (T2), the timing voltage is correlated to a calibration pattern representing a "1" logic value for a second signal left unselected from the group. In this example, the second signal is Qx. In a third timeslot period (T3), the timing voltage is correlated to a calibration pattern representing a "1" logic value for a third signal left unselected from the group, and in a fourth timeslot period (T4), the timing voltage is correlated to a calibration pattern representing a "1" logic value for a fourth signal left unselected from the group. In this example, the third and fourth signals are Iy and Qy, respectively.

As a result, the detector generates voltage pulses sequentially for the first, second, third, and fourth signals, and minimizes misalignment between the timing voltages and the reference frame calibration pattern by measuring a first difference in time between the first and third signals (T13). A second difference in time is measured between the second and fourth signals (T24), and a third difference in time between the first and second signals (T12) is also measured. In this example, timing is referenced to the start of the voltage pulse. Alternately, timing can be referenced against the voltage pulse mid-point or the end of the voltage pulse. In other aspects, the durations of the voltage pulses are contrasted.

Skew adjustments may be made using these three difference measurements. Alternately, T34, T14, and T23 could be used, or any 3 difference measurements from the total of six possible measurements. However, more accurate skew adjustments are possible using a larger set of difference measurements. For example, in one aspect, in addition to measuring T12, T24, and T13, the detector measures a fourth difference in time between the third and fourth signals (T34), a fifth difference in time between the first and fourth signals (T14), and a sixth difference in time between the second and third signals (T23). Thus, six difference measurements are used.

In another aspect, in response to measuring the first, second, and third differences, the detector calculates the fourth difference (T34), the fifth difference T14, and the sixth difference T23. The detector calculates the fourth difference as T34=T24−T23, the fifth difference as T14=T12+T24, and the sixth difference as T23=T13−T12.

Figure 4:
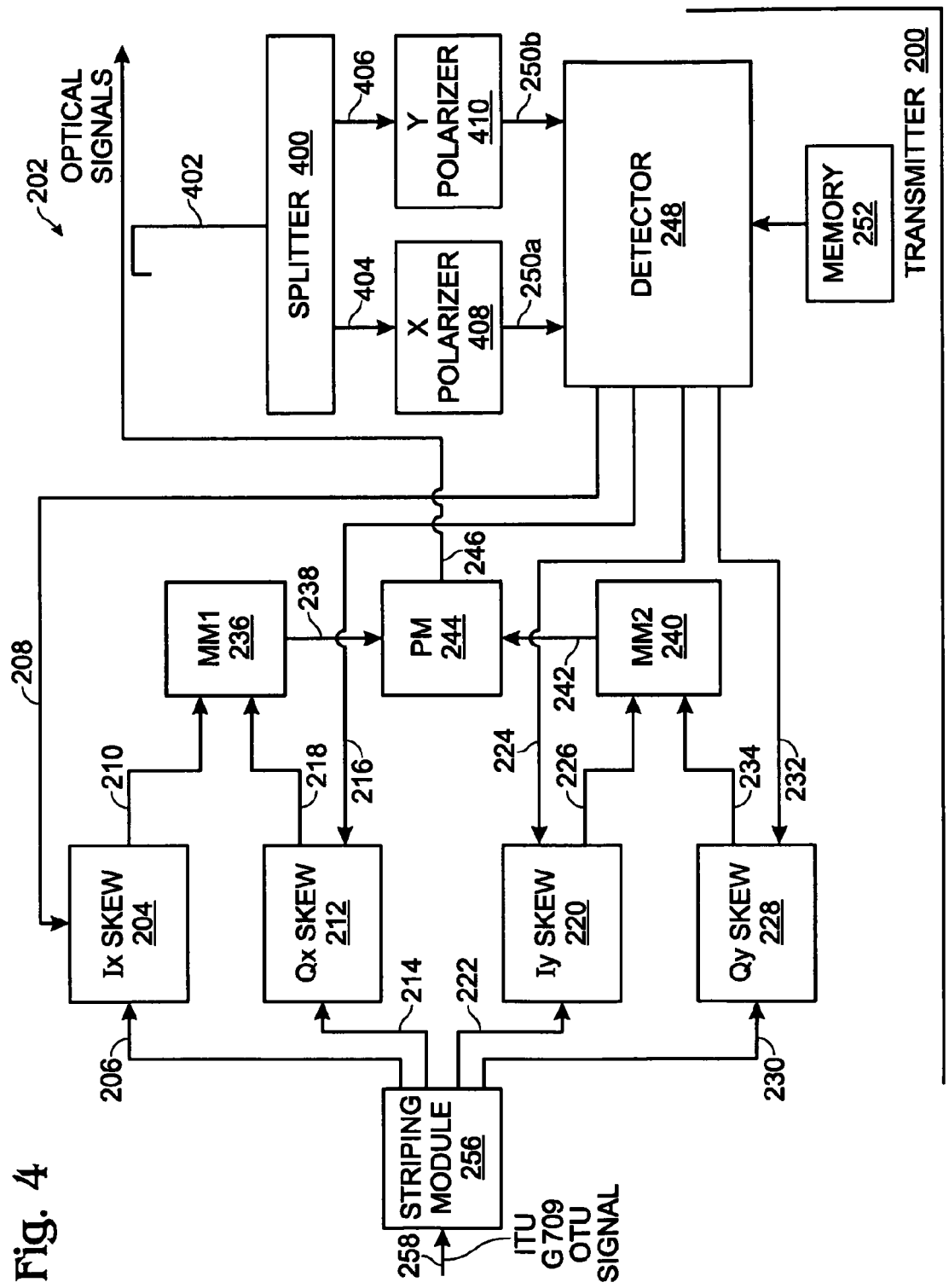
FIG. 4 is a schematic block diagram depicting a variation of the temporal skew calibration system of FIG. 2.

FIG. 4 is a schematic block diagram depicting a variation of the temporal skew calibration system of FIG. 2. In this aspect, the system 202 further comprises a splitter 400 having an input on line 402 to accept sampled $2^n$-PSK and $2^p$-PSK optical signals. The splitter 400 splits the orthogonally polarized signals into lines 404 and 406. An X polarizer 408 filters Y polarized light and has an output on line 250a to supply X polarized signals representing the combination of converted Ix and Qx signals. A Y polarizer 410 filters X polarized light has an output on line 250b to supply Y polarized signals representing the combination of converted Iy and Qy signals.

The detector 248 accepts the X polarized signals on line 250a and generates X timing signals responsive to the intensity of X polarized signals. The detector 248 accepts Y polarized signals on line 250b and generates Y timing signals responsive to the intensity of Y polarized signals.

Figure 5:
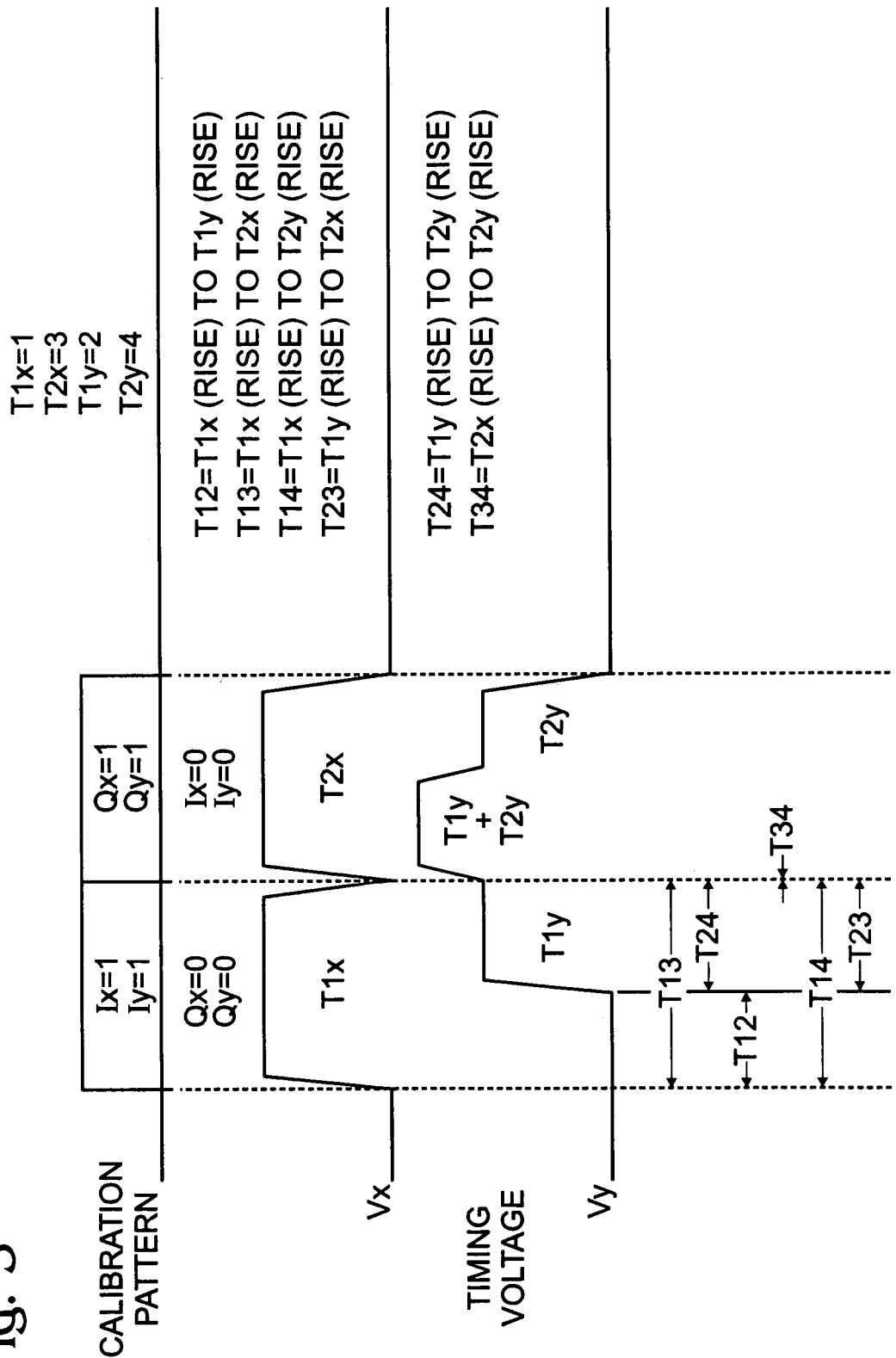
FIG. 5 is a diagram depicting an exemplary reference frame calibration pattern and timing voltages associated with the system of FIG. 4.

FIG. 5 is a diagram depicting an exemplary reference frame calibration pattern and timing voltages associated with the system of FIG. 4. In a first timeslot period (T1), the detector correlates the timing voltage to a reference frame calibration pattern representing a "1" logic value simultaneously for a first signal selected from a first group consisting of Ix and Qx signals with a second signal selected from a second group consisting of Iy and Qy signals. In this example, Ix and Iy are represented by a "1" at T1. In a second timeslot period (T2) a "1" logic value simultaneously represents a third signal left unselected from the first group, with a fourth signal left unselected from the second group. In this example, Qx and Qy are represented by a "1" at T2. The detector generates voltage pulses simultaneously for the first and second signals (Ix and Iy), followed by voltage pulses generated simultaneously for the third and fourth signals (Qx and Qy). Alternately but not shown, the first and second signals may be Ix and Qy and the third and fourth signals may be Qx and Iy. In another variation, the first and second signals may be Qx and Qy and the third and fourth signals may be Ix and Iy. In another variation, the first and second signals may be Qx and Iy and the third and fourth signals may be Ix and Qy.

The detector measures a first difference (D1) in time between the first and third signals (T13), a second difference (D2) in time between the second and fourth signals (T24), and a third difference (D3) in time between the first and second signals (T12). Skew adjustments may be made using these three difference measurements. Alternately, T34, T14, and T23 could be used, or any combination of three from the possible six measurements. However, more accurate skew adjustments are possible using a larger set of difference measurements. For example, in one aspect, in addition to measuring T12, T24, and T13, the detector measures a fourth difference in time between the third and fourth signals (T34), a fifth difference in time between the first and fourth signals (T14), and a sixth difference in time between the second and third signals (T23). Thus, six difference measurements are used.

In another aspect the detector, in response to measuring the first, second, and third differences, calculates the fourth difference (T34), the fifth difference T14, and the sixth difference T23. The detector calculates the fourth difference as T34=T24−T23, the fifth difference as T14=T12+T24, and the sixth difference as T23=T13−T12.

Functional Description

Figure 6:
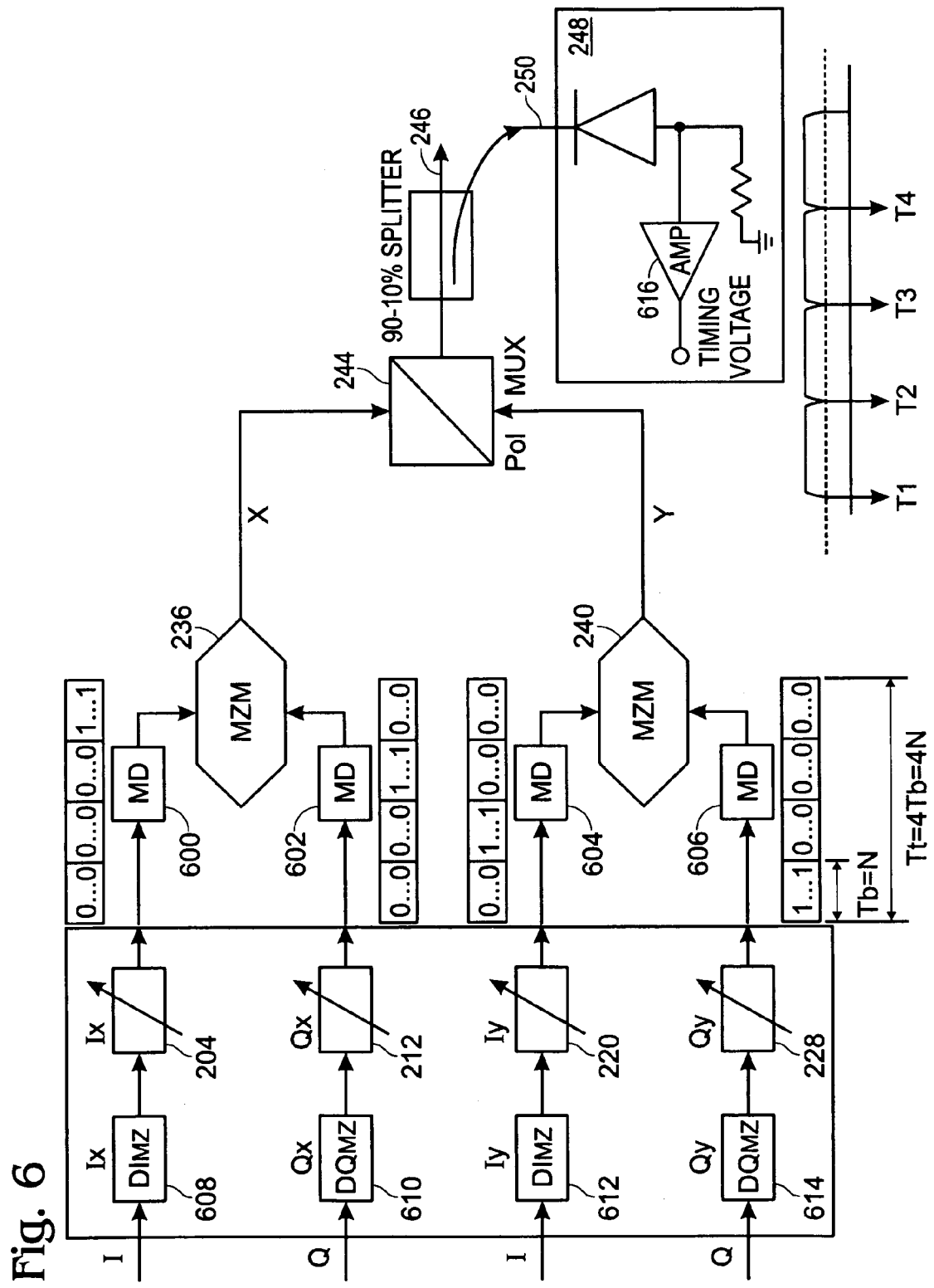
FIG. 6 is a schematic block diagram showing additional aspects of the system of FIG. 2.

FIG. 6 is a schematic block diagram showing additional aspects of the system of FIG. 2. Shown are modulation drivers (MDs) 600, 602, 604, and 606. Calibration modules 608, 610, 612, and 614 represent additional time delay that may be added in the respective channels Ix, Qx, Iy, and Qy. Calibration modules 608-614 may be used to provide a fixed degree of delay in the event that the difference in delays between lines is greater than can be compensated for by the detector. Fixed delay elements $DI_{MZMx}$ 608, $DQ_{MZMx}$ 610, $DI_{MZMy}$ 612, and $DQ_{MZMy}$ 614 may be used to compensate for additional skew between I and Q channels caused by Mach-Zehnder Modulators (MZM) for each polarization. These delays are fixed for a given MZM (dialed in once) and may be used to compensate for manufacturing imperfections between the two arms of MZM. An amplifier 616 may be used to amplify the detected voltage or current.

The basic concept of the skew control by staggered patterns is shown in this figure. Each polarization carries I and Q channels and is combined by polarization Mux 244. Before launching the signal to fiber, a portion of the signal (e.g., 10%) is diverted to direct detection, using a photodiode for example, for electrical conversion to measure the skew among channels and polarizations. During direct detection, phase and polarization information are lost. Therefore, a calibration pattern that generates light, one channel at a time, is one method of obtaining timing information for each channel using direct detection. Once each pulse is detected, the time of arrival for each non-zero pattern, T1, T2, T3, and T4, is recorded and compared to the expected, Tb, time duration of the calibration pattern. Alternately, the start and/or stop times of the timing voltage patterns can be compared to the start and/or stop times of the calibration pattern. The differences can be used to generate proportional signals to delay or advance the associated channel. In one aspect, the calibration pattern is carried in frame overhead, which is wrapped around the OTN frame structure of about 16320 bytes.

Figure 7:
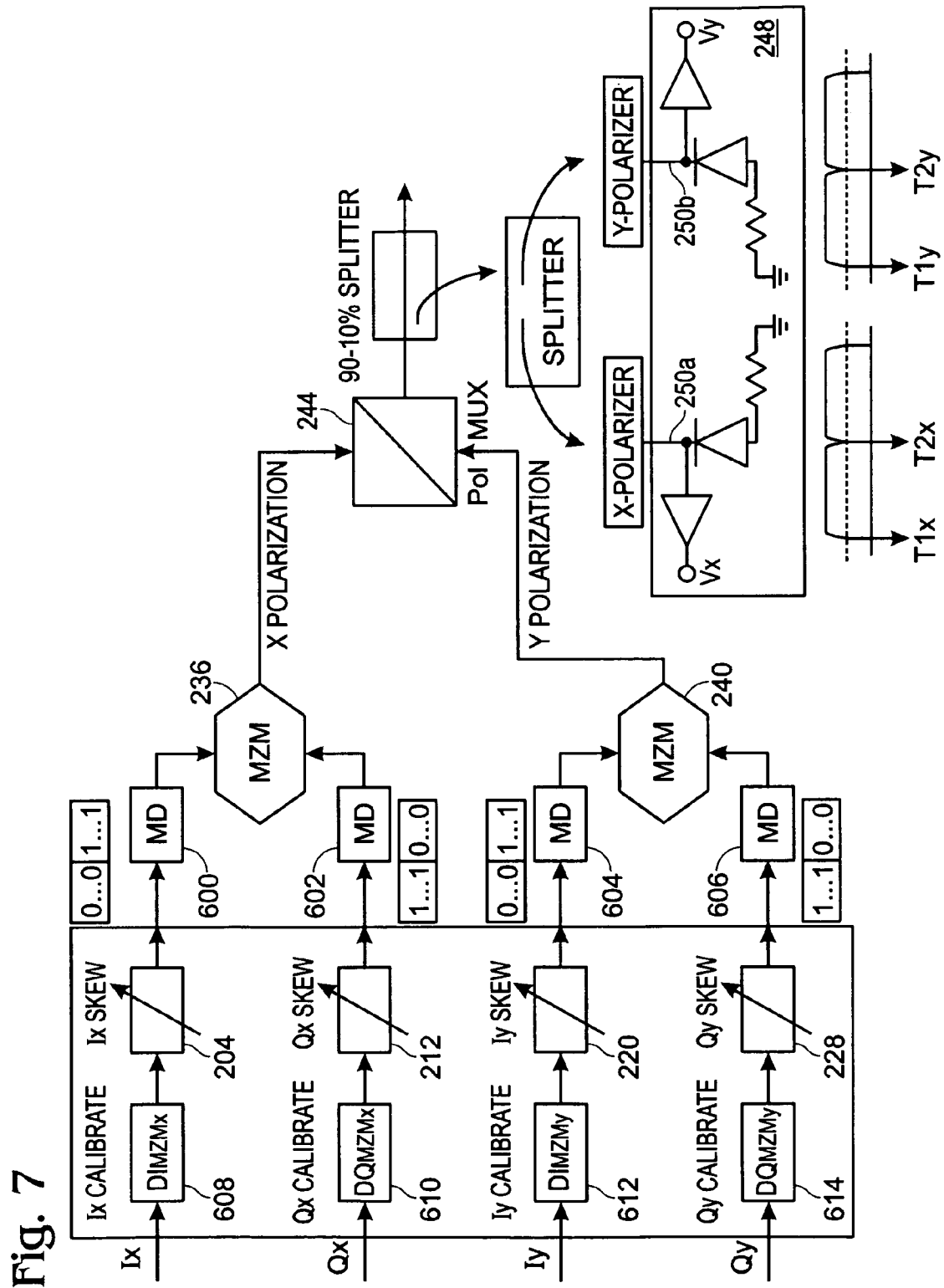
FIG. 7 is a schematic block diagram showing additional aspects of the system of FIG. 4.

FIG. 7 is a schematic block diagram showing additional aspects of the system of FIG. 4. The polarization detection method is similar to staggered pattern skew control (FIG. 6) except that the length of calibration pattern can be cut in half, at the expense of additional hardware, since each polarization is detected separately. The calibration pattern can be used to simultaneously generate signals for both X and Y polarizations. Since the splitter separates the X and Y polarizations, separate timing voltages can be generated for two channels simultaneously. Again, the timing voltage for a channel is correlated and compared to the calibration pattern time duration or start/stop times. As explained above in the explanation of FIG. 5, the time differences may all be measured, or a combination of measurements and calculated differences may be used. As compared to the system of FIGS. 2 and 6, the additional hardware needed is a splitter, an X polarizer, a Y polarizer, one extra photodiode, and one additional amplifier.

Figure 8B:
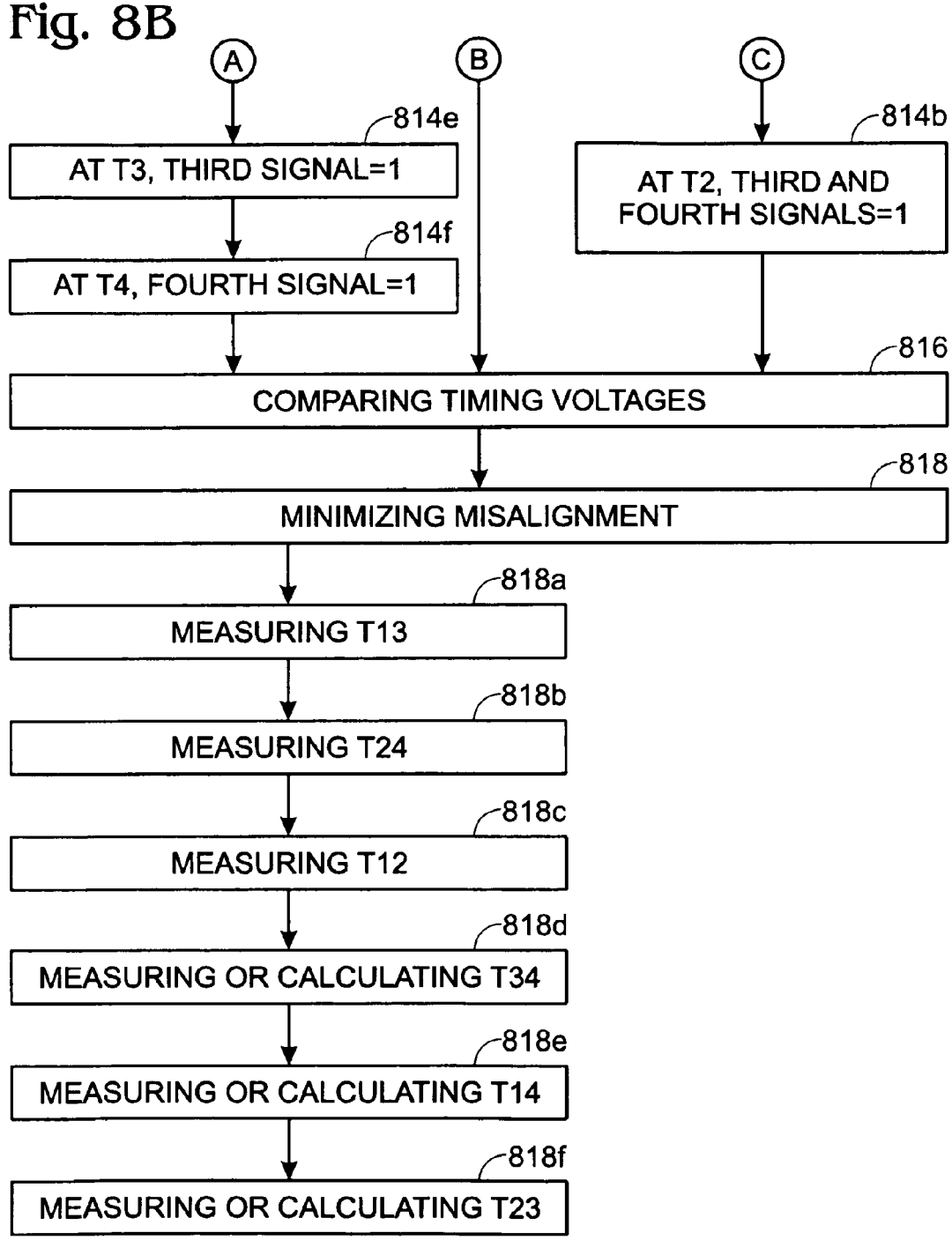

FIGS. 8A and 8B are a flowchart illustrating a method for calibrating temporal skew in a multichannel OTN transmission device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 accepts a pair of $2^n$-phase shift keying ($2^n$-PSK) modulated signals via Ix and Qx electrical signal paths, where n>1. Step 404 accepts a pair of $2^p$-PSK modulated signals via Iy and Qy electrical signal paths where p>1. Step 806 converts the $2^n$-PSK and $2^p$-PSK signals to $2^n$-PSK and $2^p$-PSK optical signals, respectively. Step 808 multiplexes orthogonally polarized $2^n$-PSK and $2^p$-PSK optical signal's, which are transmitted as orthogonally polarized signals in Step 810. Step 812 generates a timing voltage responsive to detecting the intensity of the orthogonally polarized signals. Step 814 correlates the timing voltage to a reference frame calibration pattern associated with a preamble/header portion of an OTN frame. The calibration pattern may be received in a preamble/header portion of an OTN frame or extracted from memory.

Step 816 compares the timing voltages associated with the Ix, Qx, Iy, and Qy signal paths. Step 818 minimizes misalignment between the timing voltages and the reference frame calibration pattern in response to adjusting time delay modules in the Ix, Qx, Iy, and Qy signal paths.

In one aspect, correlating the timing voltage to the reference frame calibration pattern in Step 814 includes correlating the timing voltage to a reference frame calibration pattern selectively representing a "1" logic value for each of the Ix, Qx, Iy, and Qy signals. Then, Step 812 generates a sequence of timing voltage pulses, associated with a sequence of Ix, Qx, Iy, and Qy signals in the reference frame calibration pattern, and misalignment is minimized (Step 818) by temporally matching the timing voltage pulses to the sequence of Ix, Qx, Iy, and Qy signals in the reference frame calibration pattern.

In one variation (See FIGS. 4 and 7), Step 814 correlates the timing voltage to a reference frame calibration pattern, where a "1" logic value exclusively represents each of the Ix, Qx, Iy, and Qy signals in sequence. Then, Step 812 generates a timing voltage pulse sequentially, for each of the Ix, Qx, Iy, and Qy signals in the reference frame calibration pattern, and Step 818 temporally matches the timing voltage pulses to the sequence of Ix, Qx, Iy, and Qy signals in the reference frame calibration pattern.

In this aspect, an additional step, Step 811, splits the orthogonally polarized signals into X polarized signals representing the combination of converted Ix and Qx signals, and Y polarized signals representing the combination of converted Iy and Qy signals. Correlating the timing voltage to the reference frame calibration pattern in Step 814 includes substeps. Step 814a, in a first timeslot period (T1), represents a "1" logic value simultaneously for a first signal selected from a first group consisting of Ix and Qx signals, with a second signal selected from a second group consisting of Iy and Qy signals. In a second timeslot period (T2), Step 814b represents a "1" logic value simultaneously for a third signal left unselected from the first group, with a fourth signal left unselected from the second group. Then, Step 812 generates voltage pulses simultaneously for the first and second signals, followed by voltage pulses generated simultaneously for the third and fourth signals.

Minimizing misalignment between the timing voltages and the reference frame calibration pattern in Step 818 may include the following substeps. Step 818a measures a first difference in time between the first and third signals (T13). Step 818b measures a second difference in time between the second and fourth signals (T24), and Step 818c measures a third difference in time between the first and second signals (T12).

In one aspect, Step 818d measures a fourth difference in time between the third and fourth signals (T34). Step 818e measures a fifth difference in time between the first and fourth signals (T14), and Step 818f measures a sixth difference in time between the second and third signals (T23). Alternately, in response to measuring the first, second, and third differences, Step 818d calculates the fourth difference, Step 818e calculates the fifth difference, and Step 818f calculates the sixth difference. The fourth difference is calculated as $T34=T24-T23$, the fifth difference is calculated as $T14=T12+T24$, and the sixth difference is calculated as $T23=T13-T12$.

In another aspect (see FIGS. 2 and 6), Step 814 correlates the timing voltage to the reference frame calibration pattern using the following substeps. Step 814c, in a first timeslot period (T1), represents a "1" logic value for a first signal selected from a group consisting of Ix, Qx, Iy, and Qy signals. In a second timeslot period (T2), Step 814d represents a "1" logic value for a second signal left unselected from the group. In a third timeslot period (T3), Step 814e represents a "1" logic value for a third signal left unselected from the group, and in a fourth timeslot period (T4), Step 814f represents a "1" logic value for a fourth signal left unselected from the group. Then, Step 812 generates voltage pulses sequentially for the first, second, third, and fourth signals. In common with the splitter aspect described above, Step 818 minimizes misalignment between the timing voltages and the reference frame calibration pattern by measuring the first difference (T13), the second difference (T24), and the third difference (T12). As in the splitter aspect, the fourth, fifth, and sixth differences can be either measured or calculated as described above.

A system and method have been provided for the calibration of temporal skew in a multichannel optical transport network (OTN) transmission device. Explicit circuit details and process steps have been given as examples to illustrate the invention. However, the invention is not necessarily limited to these examples. Other variations and embodiments of the invention will occur to those skilled in the art.

We claim:

1. A method for calibrating temporal skew in a multichannel optical transport network (OTN) transmission device, the method comprising:
   accepting a pair of $2^n$-phase shift keying ($2^n$-PSK) modulated signals via Ix and Qx electrical signal paths, where $n>1$;
   accepting a pair of $2^p$-PSK modulated signals via Iy and Qy electrical signal paths where $p>1$;
   converting the $2^n$-PSK and $2^p$-PSK signals to $2^n$-PSK and $2^p$-PSK optical signals, respectively;
   multiplexing orthogonally polarized $2^n$-PSK and $2^p$-PSK optical signals;
   transmitting the orthogonally polarized signals;
   generating a timing voltage responsive to detecting the intensity of the orthogonally polarized signals;
   correlating the timing voltage to a reference frame calibration pattern associated with a preamble/header portion of an OTN frame;
   comparing timing voltages associated with the Ix, Qx, Iy, and Qy signal paths; and,
   minimizing misalignment between the timing voltages and the reference frame calibration pattern in response to adjusting time delay modules in the Ix, Qx, Iy, and Qy signal paths.

2. The method of claim 1 wherein correlating the timing voltage to the reference frame calibration pattern includes correlating the timing voltage to a reference frame calibration pattern selectively representing a "1" logic value for each of the Ix, Qx, Iy, and Qy signals;
   wherein generating the timing voltage includes generating a sequence of timing voltage pulses, associated with a sequence of Ix, Qx, Iy, and Qy signals in the reference frame calibration pattern; and,
   wherein minimizing misalignment between the timing voltages and the reference frame calibration pattern includes temporally matching the timing voltage pulses to the sequence of Ix, Qx, Iy, and Qy signals in the reference frame calibration pattern.

3. The method of claim 2 wherein correlating the timing voltage to the reference frame calibration pattern includes correlating to a reference frame calibration pattern, where a "1" logic value exclusively represents each of the Ix, Qx, Iy, and Qy signals in sequence;

wherein generating the sequence of voltage pulses includes generating a timing voltage pulse sequentially, for each of the Ix, Qx, Iy, and Qy signals in the reference frame calibration pattern; and, wherein minimizing misalignment between the timing voltages and the reference frame calibration pattern includes temporally matching the timing voltage pulses to the sequence of Ix, Qx, Iy, and Qy signals in the reference frame calibration pattern.

4. The method of claim 2 further comprising:
splitting the orthogonally polarized signals into X polarized signals representing the combination of converted Ix and Qx signals, and Y polarized signals representing the combination of converted Iy and Qy signals;

wherein correlating the timing voltage to the reference frame calibration pattern includes:
in a first timeslot period (T1), representing a "1" logic value simultaneously for a first signal selected from a first group consisting of Ix and Qx signals, with a second signal selected from a second group consisting of Iy and Qy signals; and,
in a second timeslot period (T2), representing a "1" logic value simultaneously for a third signal left unselected from the first group, with a fourth signal left unselected from the second group; and, wherein generating the sequence of voltage pulses includes generating voltage pulses simultaneously for the first and second signals, followed by voltage pulses generated simultaneously for the third and fourth signals.

5. The method of claim 4 wherein minimizing misalignment between the timing voltages and the reference frame calibration pattern includes:
measuring a first difference in time between the first and third signals (T13);
measuring a second difference in time between the second and fourth signals (T24); and,
measuring a third difference in time between the first and second signals (T12).

6. The method of claim 5 wherein minimizing misalignment between the timing voltages and the reference frame calibration pattern includes:
measuring a fourth difference in time between the third and fourth signals (T34);
measuring a fifth difference in time between the first and fourth signals (T14); and,
measuring a sixth difference in time between the second and third signals (T23).

7. The method of claim 5 wherein minimizing misalignment between the timing voltages and the reference frame calibration pattern includes, in response to measuring the first, second, and third differences:
calculating a fourth difference in time between the third and fourth signals (T34);
calculating a fifth difference in time between the first and fourth signals (T14); and,
calculating a sixth difference in time between the second and third signals (T23).

8. The method of claim 7 wherein the fourth difference is calculated as T34=T24−T23;
wherein the fifth difference is calculated as T14=T12+T24; and,
wherein the sixth difference is calculated as T23=T13−T12.

9. The method of claim 1 wherein correlating the timing voltage to the reference frame calibration pattern associated with the preamble/header portion of an OTN frame includes correlating to a calibration pattern selected from a group consisting of a calibration pattern received in a preamble/header portion of an OTN frame and a calibration pattern extracted from memory.

10. The method of claim 1 wherein correlating the timing voltage to the reference frame calibration pattern includes:
in a first timeslot period (T1), representing a "1" logic value for a first signal selected from a group consisting of Ix, QX, Iy, and Qy signals;
in a second timeslot period (T2), representing a "1" logic value for a second signal left unselected from the group;
in a third timeslot period (T3), representing a "1" logic value for a third signal left unselected from the group; and,
in a fourth timeslot period (T4), representing a "1" logic value for a fourth signal left unselected from the group;

wherein generating the sequence of voltage pulses includes generating voltage pulses sequentially for the first, second, third, and fourth signals;

wherein minimizing misalignment between the timing voltages and the reference frame calibration pattern includes:
measuring a first difference in time between the first and third signals (T13);
measuring a second difference in time between the second and fourth signals (T24); and,
measuring a third difference in time between the first and second signals (T12).

11. In a multichannel optical transport network (OTN) transmission device, a system for calibrating temporal skew, system method comprising:
an Ix skew module having an input to accept an Ix signal from a pair of $2^n$-phase shift keying ($2^n$-PSK) modulated signals, where n>1, the Ix skew module having a control port and an output to supply the Ix signal delayed in time in response to signals received at the control port;
a Qx skew module having an input to accept an Qx signal from the pair of $2^n$-PSK modulated signals, the Qx skew module having a control port and an output to supply the Qx signal delayed in time in response to signals received at the control port;
an Iy skew module having an input to accept an Iy signal from a pair of $2^p$-PSK modulated signals, where p>1, the Iy skew module having a control port and an output to supply the Iy signal delayed in time in response to signals received at the control port;
a Qy skew module having an input to accept an Qy signal from the pair of $2^p$-PSK modulated signals, the Qy skew module having a control port and an output to supply the Qy signal delayed in time in response to signals received at the control port;
a first modulation module to accept the delayed Ix and Qx signals, and an output to supply a $2^n$-PSK optical signal;
a second modulation module to accept the delayed Iy and Qy signals, and an output to supply a $2^p$-PSK optical signal;
a polarization multiplexer having inputs to accept the $2^n$-PSK and $2^p$-PSK optical signals and an output to supply multiplexed orthogonally polarized $2^n$PSK and $2^p$PSK optical signals for transmission; and,
a detector having an input to accept sampled $2^n$-PSK and $2^p$-PSK optical signals and generating a timing voltage responsive to detecting the intensity of the orthogonally polarized signals, the detector correlating the timing voltage to a reference frame calibration pattern associated with a preamble/header portion of an OTN frame and comparing timing voltages associated with the Ix, Qx, Iy, and Qy signal paths, the detector having an output to supply control signals to the Ix, Qx, Iy, and Qy skew modules, for minimizing misalignment between the timing voltages and the reference frame calibration pattern in response to adjusting time delays in the Ix, Qx, Iy, and Qy signal paths.

12. The system of claim 11 wherein the detector correlates the timing voltage to a reference frame calibration pattern selectively representing a "1" logic value for each of the Ix, Qx, Iy, and Qy signals, generates a sequence of timing voltage pulses associated with a sequence of Ix, Qx, Iy, and Qy signals in the reference frame calibration pattern, and minimizes misalignment between the timing voltages and the reference frame calibration pattern by temporally matching the timing voltage pulses to the sequence of Ix, Qx, Iy, and Qy signals in the reference frame calibration pattern.

13. The system of claim 12 wherein the detector correlates the timing voltage to a reference frame calibration pattern, where a "1" logic value exclusively represents each of the Ix, Qx, Iy, and Qy signals in sequence, generates a timing voltage pulse sequentially, for each of the Ix, Qx, Iy, and Qy signals in the reference frame calibration pattern, and minimizes misalignment between the timing voltages and the reference frame calibration pattern by temporally matching the timing voltage pulses to the sequence of Ix, Qx, Iy, and Qy signals in the reference frame calibration pattern.

14. The system of claim 12 further comprising:
a splitter having an input to accept sampled $2^n$-PSK and $2^p$-PSK optical signals, the splitter splitting the orthogonally polarized signals and having an output to supply X polarized signals representing the combination of converted Ix and Qx signals; and Y polarized signals representing the combination of converted Iy and Qy signals;
wherein the detector accepts the X polarized signals and generates X timing signals responsive to the intensity of X polarized signals, and accepts Y polarized signals and generates Y timing signals responsive to the intensity of Y polarized signals;
wherein the detector, in a first timeslot period, correlates the timing voltage to a reference frame calibration pattern representing a "1" logic value simultaneously for a first signal selected from a first group consisting of Ix and Qx signals, with a second signal selected from a second group consisting of Iy and Qy signals, and in a second timeslot period, representing a "1" logic value simultaneously for a third signal left unselected from the first group, with a fourth signal left unselected from the second group; and,
wherein the detector generates voltage pulses simultaneously for the first and second signals, followed by voltage pulses generated simultaneously for the third and fourth signals.

15. The system of claim 14 wherein the detector measures a first difference in time between the first and third signals (T13), a second difference in time between the second and fourth signals (T24), and a third difference in time between the first and second signals (T12).

16. The system of claim 15 wherein the detector measures a fourth difference in time between the third and fourth signals (T34), a fifth difference in time between the first and fourth signals (T14), and a sixth difference in time between the second and third signals (T23).

17. The system of claim 15 wherein the detector, in response to measuring the first, second, and third differences, calculates a fourth difference in time between the third and fourth signals (T34), a fifth difference in time between the first and fourth signals (T14), and a sixth difference in time between the second and third signals (T23).

18. The system of claim 17 wherein the detector calculates the fourth difference as T34=T24−T23, the fifth difference as T14=T12+T24, and the sixth difference as T23=T13−T12.

19. The system of claim 11 wherein the detector correlates the timing voltage to a calibration pattern selected from a group consisting of a calibration pattern received in a preamble/header portion of an OTN frame and a calibration pattern extracted from memory.

20. The system of claim 11 wherein the detector correlates the timing voltage to a reference frame calibration pattern representing:
in a first timeslot period (T1), a "1" logic value for a first signal selected from a group consisting of Ix, Qx, Iy, and Qy signals;
in a second timeslot period (T2), a "1" logic value for a second signal left unselected from the group;
in a third timeslot period (T3), a "1" logic value for a third signal left unselected from the group; and,
in a fourth timeslot period (T4), a "1" logic value for a fourth signal left unselected from the group;
wherein the detector generates voltage pulses sequentially for the first, second, third, and fourth signals, and minimizes misalignment between the timing voltages and the reference frame calibration pattern by:
measuring a first difference in time between the first and third signals (T13);
measuring a second difference in time between the second and fourth signals (T24); and,
measuring a third difference in time between the first and second signals (T12).

* * * * *